Dec. 1, 1964  E. H. OLOFSSON  3,159,760
INDUCTION MOTOR WITH MAGNETIC CONTROL
Filed Nov. 14, 1961  2 Sheets-Sheet 1
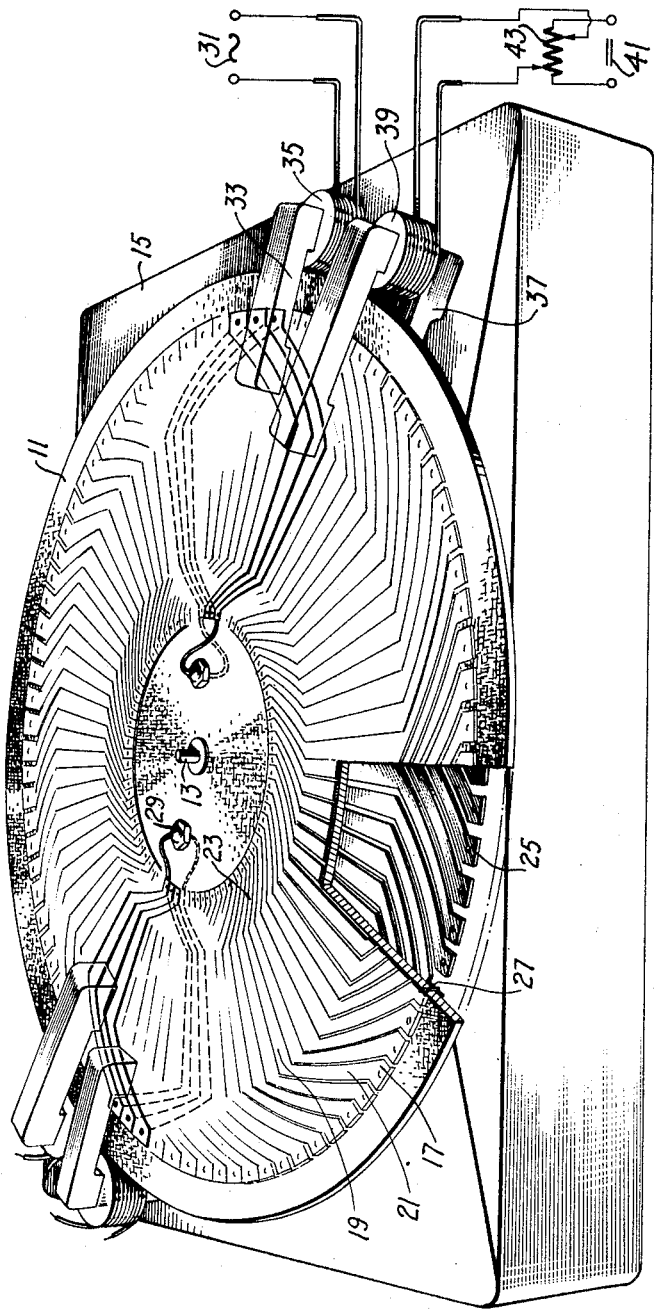
INVENTOR
ERIK HERBERT OLOFSSON
By Cushman, Darby & Cushman
ATTORNEYS Dec. 1, 1964  E. H. OLOFSSON  3,159,760
INDUCTION MOTOR WITH MAGNETIC CONTROL
Filed Nov. 14, 1961  2 Sheets-Sheet 2
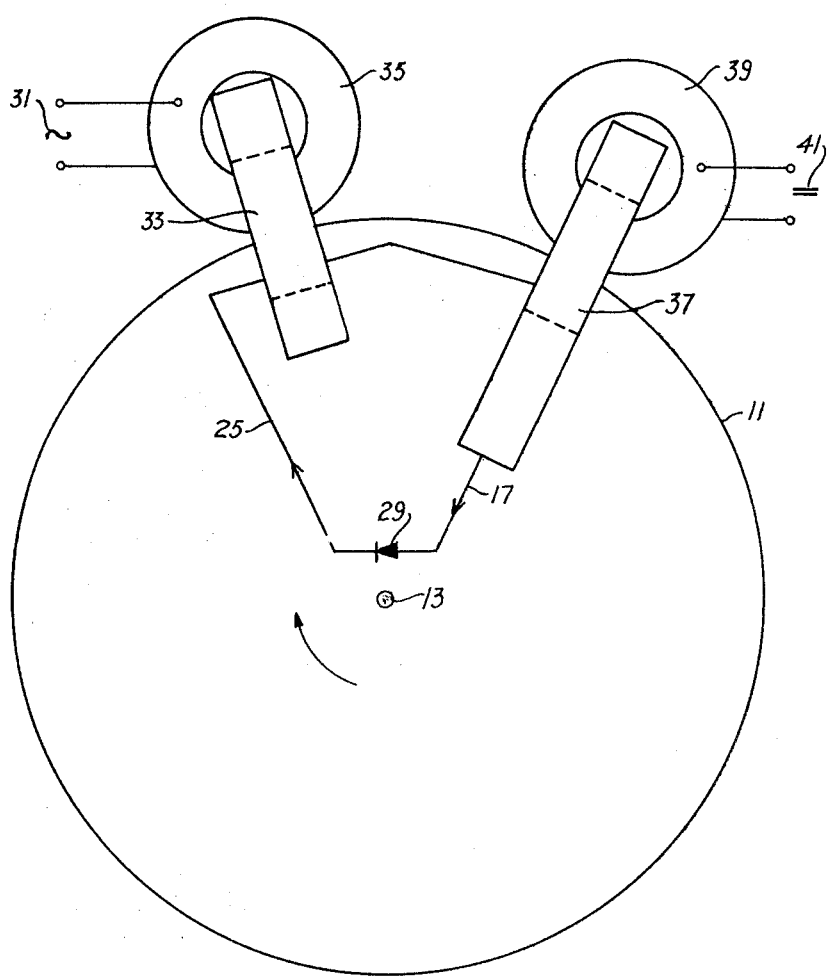
INVENTOR
ERIK HERBERT OLOFSSON
By Cushman, Darby & Cushman
ATTORNEYS

3,159,760
INDUCTION MOTOR WITH MAGNETIC CONTROL
Erik Herbert Olofsson, Johanneshov, Sweden, assignor to Regulator A.G., Glarus, Switzerland, a company of Switzerland
Filed Nov. 14, 1961, Ser. No. 152,266
Claims priority, application Sweden, Nov. 15, 1960, 10,959/60
4 Claims. (Cl. 310—166)

The invention relates to an alternating-current motor. The main object of the invention is to create such a motor of a simple design which is easy to control, particularly as to its direction of rotation, by means of an unidirectional magnetic field. Another object of the invention to obtain a simple magnetic control of an A.C. motor of the type having a disc-like rotor with short-circuited windings.

According to the invention, said objects are reached thereby that the rotor carries at least one winding forming a closed circuit in which an unidirectionally conductive element is inserted, two separate magnetic systems being provided for cooperation with said winding, viz. one for creating an alternating magnetic field and the other for creating an alternating magnetic field.

The invention will be more closely described hereinbelow with reference to the accompanying drawings, in which FIG. 1 is a perspective view of a preferred embodiment of the motor, and FIG. 2 is a simplified top plan view thereof, serving mainly to explain the mode of operation of the motor.

The rotor of the motor consists of a thin circular disc 11 of electrically insulating material. By means of a central shaft 13 said disc is supported by a stationary base or stator 15 in such a manner as to be rotary in its own plane. A concentric annular portion of the upper side of the disc is covered with a thin layer of copper which is divided up in a number of uniform lamellae or ribs 17 separated by insulating spaces. Preferably the ribs are formed by etching the copper layer in the same manner as when making printed circuits. Each rib 17 has an end at the inner periphery of the annular copper portion and another end at the outer periphery thereof, and the two rib ends are situated at or near one and the same radius of the disc. Between its ends the rib has a middle portion which is displaced in the circumferential direction relatively to the ends. For instance, the middle portion 19 may be straight and radially directed, and curved portions 21, 23 may connect the same to the end portions. The lower side of the disc 11 is provided with similar ribs 25, the ends of which are located opposite to the ends of the upper ribs 17 and connected thereto by rivets 27 extending through the disc 11. The middle portions of the lower ribs 25 are displaced relatively to their ends in a direction opposite to the circumferential direction mentioned above in respect to the upper ribs, whereby an upper rib and a lower rib directly connected thereto form a wide loop. The ends of the ribs on opposite disc sides are mutually displaced in such a manner that due to said connections a number of separate windings or coils are formed, each consisting of a number of ribs connected in series. In the embodiment shown in FIG. 1 each such coil consists of three upper and three lower ribs. The ends of each coil are connected to a rectifier 29, e.g. a germanium diode, attached to the rotor disc 11, a closed circuit thereby being formed which has a very low resistance to current in one direction and a very high resistance to current in the opposite direction. Said circuit comprises merely fixed metallic contacts.

The stator 15 comprises an alternating current magnetic system connected to an A.C. source 31 and consisting of a number of units distributed around the circumference of the rotor disc and each forming an electromagnet with an approximately C-shaped iron core 33 and a coil 35. FIG. 1 shows two such units, but a greater number may be used, and even a single one as in FIG. 2 will give a satisfactory operation of the motor. The legs of the iron core extend on opposite sides of the disc, so that the copper ribs move in the air gap of the iron core.

The stator also is provided with a direct current magnetic system serving for the control of the motor. Said system consists of electromagnets, each having an approximately C-shaped iron core 37 and a coil 39. The iron core 37, the legs of which embrace the disc 11, is displaced relatively to the iron core 33 in the circumferential direction of the disc and is located at a distance therefrom preferably corresponding to about half the width of the turns of the rotor coils. The coil 39 is connected to a D.C. source 41 which may be a battery supplying a steady tension, or a rectifier unit supplying a pulsating tension. From a voltage divider 43 connected to the terminals of said source a direct current of variable magnitude and polarity is supplied to the coil 39. The direct current may also be derived from a bridge, a measuring instrument or the like.

The operation of the motor will now be described with reference to FIG. 2. When the coil 35 is fed with alternating current and an alternating magnetic field is formed in the air gap of the iron core 33, an alternating tension is induced in the closed circuit formed by the ribs 17, 25. Due to the action of the rectifier 29 said current is a pulsating direct current always flowing in one and the same direction. If the coil 39 is currentless, the motor is at rest. However, when a direct current flows through said coil 39, an unidirectional magnetic field is created in the air gap of the iron core 37 and due to the cooperation of said magnetic field and the current flowing in the adjacent part 17 of the rotor circuit a driving torque is exerted upon the rotor disc 11. The other part 25 of the circuit, in which the current flows in a radially opposite direction, is situated too far from the iron core 37 for being acted upon by the D.C. field and for giving rise to any appreciable counteracting torque upon the rotor disc. When the rotor has turned that far from the position shown, that the circuit part 25 is located opposite the iron core 37, no current flows therein any longer, because the loop has now passed the iron core 33 and no tension is induced in the closed circuit. The motion of the rotor is maintained by cooperation between the D.C. field and other circuits or loops (not shown in FIG. 2) which are successively brought into active positions.

By changing the direction of flow of the current through the coil 39, the motor can be reversed, and by changing the magnitude of the current supplied to the coil 39 the torque and/or the speed of the motor can be controlled at will. Control of the speed may also take place by varying the strength of the current of the coil 35 or by making one or more of the iron cores displaceable.

Other modifications of the above described embodiment are also possible without departing from the scope of the invention as set forth in the following claims. For instance, the unidirectional magnetic field may be created by one or more permanent magnets. The invention is applicable also to motors having cylindrical or drumshaped rotors with common wire coils.

I claim:
1. Electric motor comprising a rotor and a stator, means for mounting said rotor for rotation relative to said stator, a closed winding carried by said rotor, an unidirectionally conductive element carried by said rotor and inserted in said closed winding, means associated with the stator for creating an alternating magnetic field for cooperation with said winding, and means circumferentially spaced from said first-mentioned means for creating an unidirectional magnetic field for cooperation with said winding.

2. Electric motor comprising an insulating disc mounted for rotation in its own plane, an electric circuit applied to the flat face of said disc, a rectifier attached to said disc and connected into said circuit so as to allow current in one direction only therethrough, a first electromagnet adapted for creating an alternating magnetic field through a peripheral part of said disc, a second electromagnet for creating an unidirectional magnetic field through another peripheral part of the disc, and a means for reversing the direction of current through said second electromagnet.

3. Electric motor as set forth in claim 1 further comprising means for reversing the direction of said unidirectional magnetic field.

4. Electric motor as set forth in claim 1 wherein the alternating magnetic field means and the unidirectional magnetic field means comprise units distributed around the circumference of the rotor.

References Cited by the Examiner

UNITED STATES PATENTS 3,056,058   9/62   Baudot _____ 310—268

FOREIGN PATENTS 1,192,094   4/59   France.

MILTON O. HIRSHFIELD, *Primary Examiner.*